May 6, 1969 H. W. HANISH ET AL 3,442,273
FILTER WASHING APPARATUS

Filed Aug. 31, 1967 Sheet 1 of 2

INVENTORS.
HARRY W. HANISH
ROBERT A. STEFFENSMEIER
BY
Drummond & Cahill
ATTORNEYS

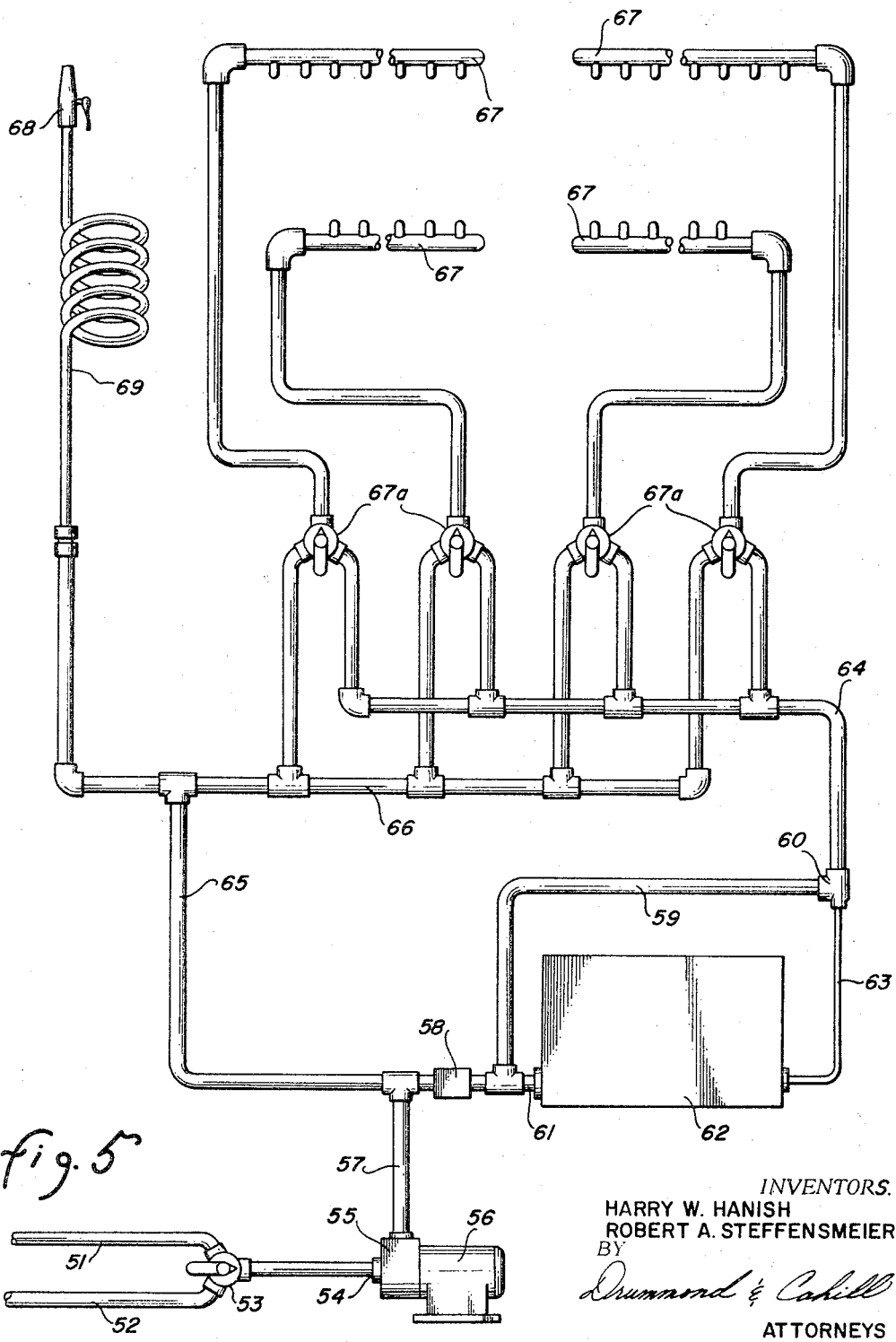

United States Patent Office 3,442,273
Patented May 6, 1969

3,442,273
FILTER WASHING APPARATUS
Harry W. Hanish, 5825 E. Lewis, Ave., Scottsdale, Ariz. 85257, and Robert A. Steffensmeier, 5547 N. 2nd St., Phoenix, Ariz. 85012
Filed Aug. 31, 1967, Ser. No. 664,688
Int. Cl. B08b 3/02
U.S. Cl. 134—100      1 Claim

ABSTRACT OF THE DISCLOSURE

A washing apparatus for tubular engine air filters including support rollers which rotate the filter element, external and internal sparge pipes which spray washing solutions on the filter elements surfaces and a valving arrangement which permits the operator to select the washing liquid to be introduced into each of the sparge pipes, the selection permitted including hot and cold and clear or soapy water.

---

This invention relates to cleaning apparatus.

The invention further concerns apparatus especially adapted to permit the operator to select the proper cleaning steps for use in cleaning each separate filter according to its particular condition.

It has been recently discovered that the tubular engine air cleaner elements commonly employed to filter the intake air for internal combustion engines can be cleaned of accumulated dirt and foreign material to the extent that they can be reused many times without sacrificing filtration efficiency. Each such cleaning can restore approximately ninety percent of the original volumetric capacity of the filter.

In cleaning very large tubular engine air filters such are commonly employed in industrial applications for diesel engines and the like, it is frequently necessary to vary the particular cleaning procedures to be employed for each filter due to the difference in condition of each filter according to its service history. For example, one filter may be heavily coated with oily materials while another may merely be coated with dust or other particulate matter. In the case of the filter having an oily residue on the surface, it may be necessary to use hot water containing detergent in order to efficiently remove the foreign material from the surface of the filter and restore it to its approximate original filtration efficiency. However, in the case of the filter having the dust coating, it is unnecessary to use the soap or detergent cleaning in hot water and it may be appropriate in many cases to merely rinse the filter element with cold clear water.

Furthermore, even when cleaning one specific filter, the interior and exterior surfaces of the filters may require different cleaning treatments. For example, it may be only necessary to rinse the interior of a specific engine air filter with cold clear water while the outside surfaces may require treatment with hot soapy water, followed by a hot clear water rinse.

Accordingly, it would be highly advantageous to provide apparatus for washing engine air filters which were specially adapted to vary the treatment conditions from filter to filter as the condition of each filter dictates.

It is therefore a principal object of the present invention to provide a filter cleaning and washing apparatus in which the operator can vary the treatment conditions according to the condition of the filter being cleaned.

Another object of the invention is the provision of filter cleaning apparatus of the type described above in which the operator has the option of selecting either hot or cold and either clear or soapy water for the treatment;

Still another object of the invention is the provision of filter washing and cleaning apparatus which is especially adapted to clean various sizes of tubular engine air filters and which requires only a short time to adjust to a new size of filter;

These and other, further, and more specific objects and advantages of the invention will become apparent to those skilled in the art from the following detailed description thereof taken in conjunction with the drawings, in which:

FIG. 5 is a schematic flow diagram illustrating the mode of connection of the elements of the device of FIGS. 1–4 and the method of controlling the apparatus to provide different cleaning conditions for different filters.

Briefly, the above stated objects and advantages of the invention are obtained by the provision of an apparatus for cleaning tubular engine air filters comprising a frame which rotatably supports a pair of substantially parallel filter support rollers, at least one of which is connected with a suitable motor for rotating at least one of the rollers. The apparatus is provided with a washing liquid spray system which includes an external sparge pipe and an internal sparge pipe. The external sparge pipe is supported by the frame of the device between parallel to and below the support rollers and is positioned to direct a plurality of liquid sprays against the exterior of an air filter carried by the support rollers. The internal sparge pipe is also supported by the frame but is positioned between parallel to and above the support rollers and may be adjusted vertically to a position to direct a plurality of liquid sprays against the interior of the air filter carried by the support rollers.

The apparatus also includes a washing liquid supply system which includes a water pump which can be selectively connected to supplies of hot and cold clear water. A soap reservoir is provided and is connected to the throat of a venturi mixer through which water from the discharge of the pump flows, thereby mixing appropriate quantities of soap with the water to provide a soapy water mixture for use in cleaning the filters. Soap is forced out of the reservoir, according to a preferred embodiment by merely providing a connection between the discharge of the pump and the soap reservoir, thereby to apply the pump discharge pressure to the soap forcing it into the venturi throat.

Each of the sparge pipes is provided with a three-position valve which allows the operator to either completely interrupt the supply of washing liquid flowing to the sparge pipe or, alternatively and selectively, to provide each pipe with hot or cold clear water directly from the discharge of the pump, or hot or cold soapy water from the venturi mixer.

In use, the device permits the operator to select either hot or cold water and either soapy or clear water to be introduced into each of the sparge pipes such that, for example, the internal sparge pipe may be supplied with cold clear water while, simultaneously, the external sparge pipe is supplied with hot soapy water.

In this manner, the operator can vary the conditions of treatment to suit the condition of the particular filter to be cleaned and by manipulaion of the three-way valves from outside the apparatus cabinet, the operator can perform a whole series of cleaning operations such as an initial rinse, a hot water rinse, a soapy hot water washing, followed by final hot and cold clear water rinses.

Figure 1:
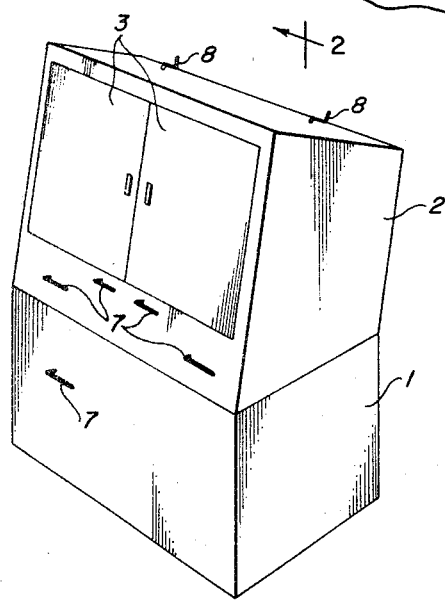
FIG. 1 is a perspective view of a filter washing apparatus embodying the present invention chosen for purposes of illustration.

Turning now to the drawings in which the details of the device chosen for purposes of illustrating the presently preferred embodiment of the invention are depicted, FIG. 1 illustrates the exterior of the device and includes a housing portion 1 which encloses the plumbing including motors, pumps and conduits for carrying various washing liquids and a washing cabinet portion 2 which encloses the support rollers, sparge pipes, etc. Doors 3 are provided which permit access to the interior of the washing cabinet for inserting and removing filters before and after cleaning operations. The various valves of the apparatus have handles 7 which project through the front of the cabinets allowing the operator to control the cleaning cycles without opening the doors of the cabinet during the washing operations. The internal sparge pipes are adjustably positioned vertically by means of the cranks 8 which extend through the top of the washing compartment cabinet.

Figure 2:
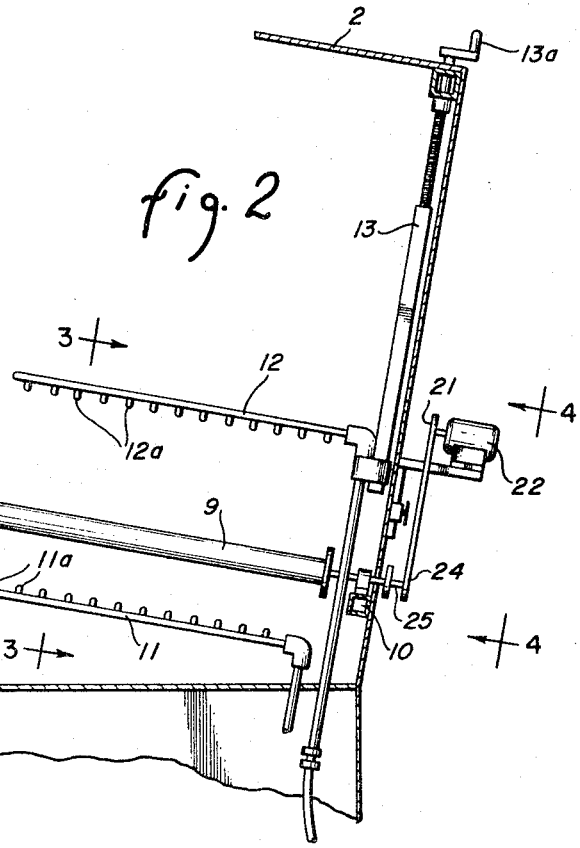
FIG. 2 is a sectional view of the filter washing apparatus of FIG. 1 taken along line 2—2 thereof.

FIG. 2 is a cross-sectional view taken along section line 2—2 of FIG. 1 and illustrates the location of the washing components. The support rollers 9, 9a are rotatably supported by the frame members 10 in a substantially parallel, preferably inclined position. The external sparge pipe 11 is supported in a position between, substantially parallel to and below the support rollers 9, 9a with the spray nozzles 11a positioned to direct a plurality of washing liquid sprays onto the outer surface of a tubular air filter supported by rollers 9, 9a. The internal sparge pipe 12 is positioned above, between and substantially parallel to the support rollers 9 with its nozzles 12a positioned to direct a plurality of washing liquid sprays against the interior of the filter element positioned upon the support rolls 9. The vertical position of the internal sparge pipe 12 can be adjusted by means of the screw jack 13 having a handle 13a extending through the top of the cabinet 2. This permits the internal sparge pipe 12 to be raised or lowered to position the sprays at an appropriate distance above the interior surface of the tubular engine air filter to obtain maximum cleaning effectiveness.

Figure 4:
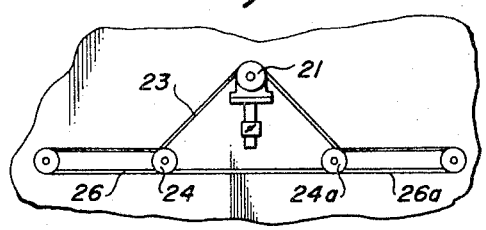
FIG. 4 is a sectional view showing details of the method of driving the support rollers, taken along section line 4—4 of FIG. 2.

The mechanism for rotating the support rolls is shown in FIG. 4. The driving pulley 21 of the motor 22 drives a belt 23 which in turn engages the pulleys 24 and 24a which are fixed on the ends of the support roller shafts 25. Another pair of belts 26 and 26a operating on coaxially disposed pulleys in turn drive the other support roller of each pair of rollers. It will be noted that in the drawings a device is illustrated having two separate pairs of support rollers, thus enabling one to clean two engine air filter elements simultaneously. It will be appreciated by those skilled in the art that one can employ any suitable number of pairs of these support rollers and that similar drive mechanisms can be employed to drive any number of pairs of such rollers contained within the cabinet. It will also be apparent, that it is absolutely necessary to drive only one of each of the pairs of rollers, leaving the other roller "free wheeling."

Figure 3:
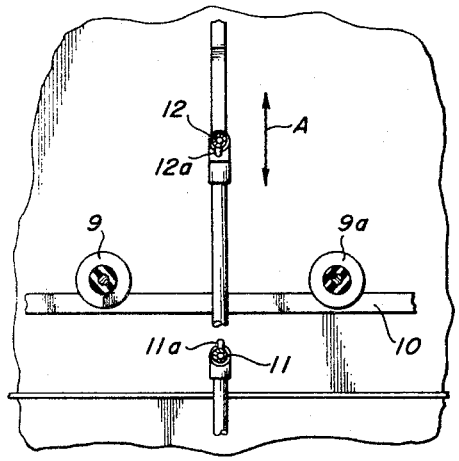
FIG. 3 is a sectional view of the internal mechanism of the filter washing apparatus of FIG. 2 taken along section 3—3 thereof.

FIG. 3 is a cross-sectional view taken along section line 3—3 of FIG. 2 and illustrates the relative positions of the support rollers 9 and 9a which are rotatably supported by a member of the frame 10 in a substantially parallel relationship. The external sparge pipe 11 with its upwardly directed spray nozzles 11a is supported therebetween, parallel to and below the support rollers 9 and 9a. The adjustably positionable internal sparge pipe 12 is supported above, parallel to and between the support rollers 9 and 9a and the vertical position of the sparge pipe may be varied along a line indicated by the arrow A to move the spray nozzles 12a into appropriate proximity to the interior surfaces of the filter to obtain maximum cleaning efficiency.

FIG. 5 illustrates schematically the connection of the various elements of the device of FIGS. 1–4 to provide the requisite flexibility in selection of the particular treatment steps to be employed for each engine air filter. A hot water line 51 and a cold water line 52 are connected to a three-way valve 53 which permits the operator to select either hot or cold water or to shut off the flow of water to the entire system. The three-way valve 53 directs the hot or cold water to the inlet 54 of a pump 55 driven by motor 56. The liquid discharged by the pump is directed through conduit 57, through a check valve 58 and thence by means of conduit 59 to the inlet of a venturi mixer 60. The discharge pressure of the pump is applied through conduit 61 to the interior of the soap reservoir 62 forcing soap through a discharge line 63 to the throat of the venturi 60 where it is mixed with the incoming water from conduit 59 to form a soap solution which is transmitted to the washing apparatus by means of conduit 64.

A portion of the water discharged from the pump through conduit 57 is directed through conduit 65 to a header 66 which supplies clear water to the sparge pipes. Each of the sparge pipes 67 has a three-way valve 67a associated therewith which allows the operator to completely interrupt the supply of washing liquid to each particular sparge pipe or to select soapy water from conduit 64 or clear water from conduit 66. Obviously, whether soapy or clear, the water temperature will be regulated by operation of the valve 53 to provide either hot or cold water.

To further facilitate the cleaning operations and to provide even greater flexibility, I preferably provide a hand-held spray 68 which is connected by means of a flexible conduit 69 to the clear water header 66 to provide for spot rinsing of any portion of the element which, upon visual inspection, appears to require such treatment.

It will thus be apparent to those skilled in the art that the device described and illustrated above provides an efficient, highly flexible system for cleaning engine air filters. The system is quickly adaptable to different sizes of filters and where several pairs of the sparge pipes are employed, it is even possible to clean different sizes of filters at the same time. Furthermore, the particular treatment conditions required for each particular filter according to its conditions before cleaning can be easily selected by the operator and tailored to meet the various types of dirt, grease, etc. encountered in each filter. It is even possible to provide one cleaning cycle for the interior surfaces and another cleaning cycle for the exterior surfaces of the same filter.

Various changes in the devices chosen for purposes of illustration in the drawings will readily occur to persons skilled in the art having regard for the disclosure hereof. To the extent that such modifications and variations do not depart from the spirit of the invention, they are intended to be included within the scope thereof which is not limited to the devices specifically illustrated in the drawings, but, rather, only by a just interpretation of the following claim.

Having fully described the invention in such manner as to enable those skilled in the art to understand and practice the same, the invention claimed is:

1. An apparatus for cleaning tubular engine air filters comprising:
 (a) a frame,
 (b) a pair of substantially parallel filter support rollers extending across and rotatably supported by said frame,
 (c) motor means for rotating at least one of said rollers,
 (d) a washing liquid spray system including
  an external sparge pipe supported by said frame between, parallel to and below said support rollers and positioned to direct a plurality of liquid sprays against the exterior of an air filter carried by said support rollers, and an internal sparge pipe supported by said frame between, parallel to and above said support rollers and adjustably vertically positioned to direct a plurality of liquid sprays against the interior of said air filter carried by said support rollers.

(e) a washing liquid supply system including
a water pump having inlet and discharge ports,
means for selectively supplying hot and cold clear water to the inlet port of said pump,
a soap reservoir having an inlet and outlet,
conduit means connecting said pump discharge port with said soap reservoir inlet port,
a venturi mixer having inlet, outlet and throat ports,
conduit means connecting said soap reservoir outlet port with said venturi throat port,
conduit means connecting said pump discharge port with said venturi inlet port,
valve means associated with each of said sparge pipes, having an outlet communicating with said sparge pipe, a clear water inlet and a soapy water inlet, said valve means adapted to interrupt the flow of liquid into said sparge pipes and to selectively supply clear and soapy water to said sparge pipes,
conduit means connecting said venturi mixer outlet port with the soapy water inlet of each of said valve means, and
conduit means connecting said pump discharge with the clear water inlet of each of said valve means.

References Cited

UNITED STATES PATENTS

| | | | |
|---|---|---|---|
| 2,624,618 | 1/1953 | Gelles et al. | 134—102 XR |
| 2,919,704 | 1/1960 | Butler | 134—102 |
| 2,987,067 | 6/1961 | Vani et al. | 134—102 |
| 3,216,429 | 11/1965 | Dick | 134—102 |
| 2,699,793 | 1/1955 | Buck et al. | 134—155 XR |

FOREIGN PATENTS 797,940   7/1958   Great Britain.

DANIEL BLUM, *Primary Examiner.*

U.S. Cl X.R.

134—140, 152, 170